(12) United States Patent
Hurewitz (10) Patent No.: US 7,752,103 B2
(45) Date of Patent: Jul. 6, 2010

(54) SYSTEMS AND METHODS FOR AUCTIONING ACCESS TO SECURITIES RESEARCH RESOURCES

(75) Inventor: Barry S. Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 1248 days.

(21) Appl. No.: 10/939,087

(22) Filed: Sep. 10, 2004

(65) Prior Publication Data

US 2006/0059075 A1    Mar. 16, 2006

(51) Int. Cl.
*G06Q 40/00* (2006.01)
*G06F 17/50* (2006.01)
(52) U.S. Cl. .......................................... 705/35; 705/7
(58) Field of Classification Search ................ 705/35, 705/7
See application file for complete search history.

(56) References Cited

U.S. PATENT DOCUMENTS

| | | | |
|---|---|---|---|
| 4,710,763 A | 12/1987 | Franke et al. | |
| 5,128,860 A | 7/1992 | Chapman | |
| 5,502,637 A * | 3/1996 | Beaulieu et al. | 705/36 R |
| 5,630,070 A | 5/1997 | Dietrich et al. | |
| 5,822,410 A | 10/1998 | McCausland et al. | |
| 5,864,853 A | 1/1999 | Kimura et al. | |
| 5,913,201 A | 6/1999 | Kocur | |
| 5,940,843 A * | 8/1999 | Zucknovich et al. | 715/210 |
| 5,963,911 A | 10/1999 | Walker et al. | |
| 5,968,121 A | 10/1999 | Logan et al. | |
| 6,029,146 A | 2/2000 | Hawkins et al. | |
| 6,049,599 A | 4/2000 | McCausland et al. | |
| 6,292,830 B1 | 9/2001 | Taylor et al. | |

(Continued)

FOREIGN PATENT DOCUMENTS

JP    2003/345971    5/2003

(Continued)

OTHER PUBLICATIONS

"National Express Group PLC Analyst and Investor Seminar": May 7, 2004, p. 1.*

(Continued)

*Primary Examiner*—Daniel S Felten
*Assistant Examiner*—Mohammad Z Shaikh
(74) *Attorney, Agent, or Firm*—K&L Gates LLP (57) ABSTRACT

Methods and systems for auctioning units of securities research resources from a supplier of securities research services to potential consumers of the supplier's securities research are disclosed. According to various embodiments, the method includes the steps of receiving from a plurality of the potential consumers at least one bid for at least one unit of the securities research resources services of the supplier in at least one bidding stage, and allocating units of securities research resources services of the supplier to certain of the potential consumers (i.e., winning bidders) based on the received bids of the potential consumers. The units may be, for example, research time units of a research team of the supplier of the securities research. Also, the units may be a preferred service access level to a member of a research team of the supplier of the securities research. The preferred access level may entitle a holder thereof to direct enhanced consultative contact with the member of the research team.

11 Claims, 4 Drawing Sheets

```
                                        30
 ┌─────────────────────────────────────────/────────────────┐
 │ PLACE A BID      32                34                     │
 │                  /                 /                  36  │
 │   Item No. 12345:  Preferred Access Level Seat with Analyst X
 │                For more details about the Preferred Access Level Seat click here.
 │                    50 Preferred Access Seats are being auctioned.
 │              38
 │   Minimum Bid Price:       $1000.00
 │
 │   Number of Auction Stages:  2
 │
 │   Current Auction Stage:     2
 │
 │   Current Auction Stage ends in:   2 days, 11 hours, 14 minutes.
 │
 │   Number of Bids Already Submitted:   124
 │                                          40
 │   Enter Your Bid:
 │     Quantity Requested: [          ]              42
 │     Maximum Bid Price for Each Requested Item: [         ]
 │
 │                          ┌─────────┐  44
 │                          │SUBMIT BID│
 │                          └─────────┘
 └──────────────────────────────────────────────────────────┘
```

U.S. PATENT DOCUMENTS

| | | |
|---|---|---|
| 6,324,523 B1 | 11/2001 | Killeen, Jr. et al. |
| 6,330,545 B1 | 12/2001 | Suh |
| 6,374,227 B1 | 4/2002 | Ye |
| 6,381,744 B2 | 4/2002 | Nanos et al. |
| 6,415,269 B1 | 7/2002 | Dinwoodie |
| 6,470,325 B1 | 10/2002 | Leemhuis |
| 6,507,825 B2 | 1/2003 | Suh |
| 6,510,419 B1 | 1/2003 | Gatto |
| 6,519,571 B1 | 2/2003 | Guheen et al. |
| 6,671,674 B1* | 12/2003 | Anderson et al. ............. 705/26 |
| 6,681,211 B1 | 1/2004 | Gatto |
| 6,968,317 B1 | 11/2005 | Wallace et al. |
| 7,072,858 B1 | 7/2006 | Litzow et al. |
| 7,171,471 B1 | 1/2007 | Nair |
| 2002/0016752 A1 | 2/2002 | Suh |
| 2002/0035534 A1* | 3/2002 | Buist et al. .................... 705/37 |
| 2002/0055901 A1 | 5/2002 | Gianakouros et al. |
| 2002/0065758 A1* | 5/2002 | Henley ........................ 705/37 |
| 2002/0111890 A1 | 8/2002 | Sloan et al. |
| 2002/0198815 A1 | 12/2002 | Greifeld et al. |
| 2003/0083926 A1 | 5/2003 | Semret et al. |
| 2003/0101124 A1 | 5/2003 | Semret et al. |
| 2003/0144932 A1 | 7/2003 | Martin et al. |
| 2003/0158807 A1 | 8/2003 | Takeshi |
| 2003/0225666 A1 | 12/2003 | Murtaugh et al. |
| 2003/0236721 A1 | 12/2003 | Plumer et al. |
| 2004/0010592 A1 | 1/2004 | Carver et al. |
| 2004/0088206 A1 | 5/2004 | Thompson et al. |
| 2004/0111308 A1 | 6/2004 | Yakov |
| 2004/0138998 A1 | 7/2004 | Lawrence |
| 2004/0181378 A1 | 9/2004 | Gilmore |
| 2005/0096950 A1 | 5/2005 | Caplan et al. |
| 2005/0097028 A1 | 5/2005 | Watanabe et al. |
| 2005/0125274 A1 | 6/2005 | Nastacio et al. |
| 2005/0172083 A1 | 8/2005 | Meiri |
| 2005/0216323 A1* | 9/2005 | Weild ............................ 705/7 |
| 2005/0240456 A1* | 10/2005 | Ward et al. ..................... 705/7 |
| 2005/0246264 A1* | 11/2005 | Plunkett ...................... 705/37 |
| 2005/0261922 A1 | 11/2005 | Marchisotto et al. |
| 2005/0261999 A1* | 11/2005 | Rowady, Jr. .................. 705/35 |
| 2005/0278240 A1 | 12/2005 | Delenda |
| 2006/0167703 A1 | 7/2006 | Yakov |
| 2007/0264986 A1 | 11/2007 | Warrillow et al. |
| 2008/0021805 A1 | 1/2008 | Hansen et al. |

FOREIGN PATENT DOCUMENTS

| | | |
|---|---|---|
| JP | 2003/288469 | 10/2003 |

OTHER PUBLICATIONS

Prudential Financial to Host Analyst and Investor Conference in Tokyo, Sep. 23, 2004, Business Wire, Jan. 23, 2004.*
"An Interview with Mark Coker, Founder of Best Calls", 2000.*
"Analyst Meeting", Dell Inc,. Austin, Texas, Apr. 8, 2004.*
"Sol ving the Sell-Side Research Problem: Insights from Buy-Side Professionals", Kent L. Womack, Tuck School of Business, Dartmouth College, Hanonver, NH 03755.*
"Business to Business Exchanges", Information Systems Management, Marie Tumolo, vol. 18, Issue 2, 2001, pp. 1-9.*
"The October Revolution on Wall Street: Strategies for adapting to the changing research landscape," Coffin Communications Group, Jun. 2003.
L. Boni and K. Womack, "Wall Street's Credibility Problem: Misaligned Incentives and Dubious Fixes?," 5th Annual Brookings-Wharton Conference on the Future of Securities Markets, *Brookings-Wharton Papers on Financial Services,* 2002.
Non-Final Office Action mailed Mar. 19, 2008 for U.S. Appl. No. 10/856,442.
Non-Final Office Action mailed Dec. 11, 2008 for U.S. Appl. No. 10/856,442.
Interview Summary mailed Mar. 17, 2009 for U.S. Appl. No. 10/856,442.
Non-Final Office Action mailed May 21, 2008 for U.S. Appl. No. 10/857,526.
Non-Final Office Action mailed Mar. 16, 2009 for U.S. Appl. No. 10/857,526.
Interview Summary mailed May 15, 2009 for U.S. Appl. No. 10/857,526.
Non-Final Office Action mailed May 6, 2008 for U.S. Appl. No. 10/857,400.
Interview Summary mailed Jul. 14, 2008 for U.S. Appl. No. 10/857,400.
Non-Final Office Action mailed Dec. 9, 2008 for U.S. Appl. No. 10/857,400.
Interview Summary mailed Apr. 2, 2009 for U.S. Appl. No. 10/857,400.
U.S. Appl. No. 10/856,442, filed May 28, 2004.
U.S. Appl. No. 10/857,526, filed May 28, 2004.
U.S. Appl. No. 10/857,400, filed May 28, 2004.
U.S. Appl. No. 11/450,994, filed Jun. 12, 2006.
"Code of Practice for Enhanced Commissions Processing," Thomson Financial esg, OASYS, Sep. 28, 2000, pp. 1-69.
Levitt, A., "Speech by SEC Chairman: Remarks before the 2000 Annual Meeting Securities Industry Association," US Securities and Exchange Commission, Boca Raton, Florida, Nov. 9, 2000.
Brennan et al., "Brokerage Commission Schedules," The Journal of Finance, vol. 48, No. 4, Sep. 1993, pp. 1379-1402.
Boni, L. et al., "Solving the Sell-Side Research Problem: Insights from Buy-Side Professionals," working paper, University of New Mexico, Aug. 8, 2002.
McCafferty, J., "Reform of sell-side research is creating a variety of new headaches for corporations," CFO Magazine, May 1, 2003.
"Bracing for Disclosure of Soft Dollars," Wall Street & Technology, Aug. 27, 2004.
Myner, "Institutional Investment in the United Kingdom: A Review," Mar. 6, 2001 ("The Myner's Report").
U.S. Dept. of Energy, "Activity Based Costing," Cost Estimating Guide, Chap. 24, Mar. 1997.
Roztocki et al., "An Integrated Activity-Based Costing and Economic Value Added System As An Engineering Management Tool for Manufacturers," 1998 ASEM National Conference Proceedings, Virginia Beach, Oct. 1-3, 1998, pp. 77-84.
Granof et al., "Using Activity-Based Costing to Manage More Effectively," PriceWaterhouseCoopers Report, Jan. 2000.
"2004 US Equity Research Industry Outlook—Table of Contents", Integrity Research Associates (3 pages).
"The Commission System", Treatise, Broker-Dealer-Law-and-Regulation, Section 10.02 The Commission System, 2008 (10 pages).
Anonymous, "Sell-Side Story", PRweek (U.S. ed.), New York, Jul. 7, 2003, p. 17 (5 pages), vol. 6, Issue 26.
Boni, Leslie et al., "Wall Street Research: Will New Rules Change Its Usefulness?", Financial Analysts Journal, May/Jun. 2003 (7 pages), vol. 59, Issue 3, ABI/Inform Global.
Thomson, "Best Practices Report: The Broker Voting Process, Commentary and Analysis", Thomson Extel Surveys, Feb. 2008 (5 pages).
Business Editors/High-Tech Writers, "Independent Research Group Builds Equity Research Team", Business Wire, New York, Mar. 13, 2003, p. 1 (5 pages).
Chapman, Peter, "Keeping a Score for Traders: A Database That Keeps Track of Customer Business", Traders Magazine, New York, Dec. 1, 2003, p. 1 (3 pages).
Chen, Zhaohui, "Buy-Side and Sell-Side: The Industrial Organization of Information Production in the Securities Industry", University of Pennsylvania—The Wharton School, Mar. 2004, pp. 1-64.
"Equity Research Outlays Projected to Nearly Double in Next Five Years", PR Newswire, New York, Jun. 21, 2004, p. 1 (2 pages).
"Buy-Side Still Values Sell-Side Research, Study Says", FinanceTech, Mar. 26, 2008 (2 pages).
"Facing the Charges for Research: The Way Fund Managers Bill Their Clients Needs Reform; [London 1st Edition]", Financial Times, London (UK), Oct. 13, 2003, p. 20 (3 pages).

"The Future of Equity Research: Where Will the Investment Community Look?", PR Newswire, New York, Feb. 4, 2004, p. 1 (2 pages).

"International Managers Feel Pinch of Sellside's Cost-Cutting Moves", Fund Action, New York, Jun. 30, 2003, p. 1 (2 pages).

Friedlander, Josh, "Independents to Gobble Research Pie in FutureStudy says Industry to Nearly Triple, Taking Money from Big Street Firms", The Investment Dealers' Digest: IDD, New York, Jul. 5, 2004, p. 1 (2 pages).

Nocera, Joseph, "Wall Street on the Run", Fortune, New York, Jun. 14, 2004, vol. 149, Issue 12, p. 107 (6 pages).

Leone, Marie, "The Flight of the Sell-Side Analyst", CFO.com, Boston, Jul. 8, 2004, p. 1 (2 pages).

McCafferty, Joseph. "Reform of Sell-Side Research is Creating a Variety of New Headaches for Corporations", CFO, Boston, May 1, 2003, p. 1 (5 pages).

Mehta, Nina, "Sellside Research Must Try Harder: Rocked by Scandals, Institutional Sellside Research will Never be the Same", Traders Magazine, New York, Dec. 1, 2003, p. 1 (6 pages).

Milhench, Claire, "Global Brokers Survey: Rethinking the Research Model", Global Investor, London, Sep. 2004, p. 1 (29 pages).

Krantz, Matt, "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea . . . .

Munk, Cheryl Winokur, "Analysts' Roles Evolve With Incentives", Wall Street Journal (Eastern Edition), New York, May 21, 2003, p. 1 (4 pages).

Chapman, Peter, "Rating Sellside Services: Software Made for Buyside Spendthrifts", Traders Magazine, New York, May 1, 2004, p. 1 (3 pages).

SEC-REL, SEC-DOCKET 79 SEC-DOCKET 2540-113, "United States of America Before the Securities and Exchange Commission", Release No. ID-225, Administrative Proceeding File No. 3-10607, Mar. 19, 2003 (13 pages).

"Sell-Side Analysts Heading to the Buy Side", Real Estate Finance and Investment, New York, Nov. 3, 2003, p. 1 (2 pages).

Sisk, Mike, "The Best of the Buy Side—II Magazine Platinum", Institutional Investor, (International Edition), New York, Jun. 2003, p. 1 (6 pages).

Stock, Howard, "Most Buy Siders Use Sell-Side Reports for Tips, Despite Conflicts", Investor Relations Business, New York, May 12, 2003, p. 1 (4 pages).

Gullapalli, Diya, "Moving the Market—Tracking the Numbers/Street Sleuth: On Governance, Wall Street May Carry Big Stick; After a Report by Goldman, Companies Make Changes; Right Role for 'Sell Side'?", Wall Street Journal, (Eastern Edition), New York, Aug. 31, 2004, p. C.3 (2 pages).

"Eliot Spitzer on His Fund Blitzkrieg", Business Week (Online), New York, Sep. 18, 2003, p. 1 (3 pages).

Mehta, N. "Sellside Research Must Try Harder: Rocked by Scandals, Institutional Sellside Research Will Never by the Same", Traders Magazine, New York, Dec. 1, 2003, p. 1 (6 pages).

Final Office Action mailed Aug. 4, 2009 for U.S. Appl. No. 10/856,442.

Final Office Action mailed Aug. 3, 2009 for U.S. Appl. No. 10/857,400.

Anonymous, "LA Based Credit Union Installs Harland's Touche Solution", May 2002, Bank Systems and Technology, V39N5, 2 pages.

Anonymous, "Business Objects Launches Ithena, Inc.: New Subsidiary Defines First E-Customer Intelligence Analytic Application" Feb. 9, 2000, Business Wire, 0006.

Interview Summary mailed Aug. 27, 2009 for U.S. Appl. No. 10/856,442.

Notice of Allowance mailed Oct. 6, 2009 for U.S. Appl. No. 10/857,526.

Notice of Allowance mailed Dec. 14, 2009 for U.S. Appl. No. 10/856,442.

Notice of Allowance mailed Nov. 17, 2009 for U.S. Appl. No. 10/857,400.

Interview Summary mailed Nov. 17, 2009 for U.S. Appl. No. 10/857,400.

* cited by examiner

AUCTION RESULTS - COMPLETED AUCTIONS

Item No. 12345:     Preferred Access Level Seat with Analyst X

Auction Completed:  Aug 1, 2004, 12:00 PM EST

Number of Preferred Access Level Seats Auctioned:  50

| Winning Bidders | Allocated Units |
|---|---|
| Firm A | 1 |
| Firm B | 1 |
| Firm C | 1 |
| ... | |

Fig. 5

SYSTEMS AND METHODS FOR AUCTIONING ACCESS TO SECURITIES RESEARCH RESOURCES

BACKGROUND OF THE INVENTION

The present invention generally concerns systems and methods for auctioning access to securities research resources.

In the securities research industry, so called "sell-side firms" provide, among other things, research regarding securities (such as stocks or bonds) to so-called "buy-side firms," i.e. institutional investors such as mutual funds, hedge funds, pension funds, etc. Typically, particularly for equity research, sell-side firms employ a number of analyst teams that analyze equity securities in different industry sectors and/or geographic regions. The analyst teams typically include a primary analyst and several research associates, though some teams may have other positions as well. These research teams generate numerous different types of research touch points for consumers of the research (e.g., the buy-side firms). The research touch points may include research reports (e.g., published electronic or hard copy reports), one-to-one telephone calls or meetings with contacts at the buy-side firms, tailored or blast e-mails and voicemails to such contacts, as well as other events such as seminars, conferences, corporate road shows, and meetings with corporate management.

In addition, different buy-side clients may seek and/or be provided with different levels of research services from the sell-side firm. For example, some buy-side clients of a sell-side firm may be entitled to participate in certain events, such as corporate road shows or corporate management meetings with the primary analyst in attendance, while other buy-side clients may not.

Historically, sell-side firm analysts have in large part determined the level of service received by a particular buy-side client firm. However, this may not result in an efficient allocation of resources by the securities research department.

SUMMARY OF THE INVENTION

In one general aspect, embodiments of the present invention are directed to systems and methods for auctioning units of securities research resources of a supplier of securities research (e.g. a sell-side firm) to consumers of the supplier's securities research (e.g., buy-side firms). The method, according to the various embodiments, may be performed by the supplier of the securities research and may employ a Dutch auction-type format. The method may include the step of receiving from a plurality of potential consumers at least one bid for at least one unit of the securities research resources of the supplier in at least one bidding stage. The bids may include a specified quantity of the unit and a corresponding price for the specified quantity. The method may also include the step of allocating the units of the securities research resources of the supplier to certain of the potential consumers (i.e., the winning bidders) based on the received bids. Thus, the winning bidders would receive their allocated units of securities research resources. There may be one or more such bidding stages. The auction may be repeated periodically to accommodate changes in demand/supply, such as quarterly, annually, etc.

The units of securities research resources may be, for example, hours of time spent by a research team (e.g., covering a particular industry or sub-industry) of the supplier of the securities research (e.g., the sell-side firm) for the benefit of a client/buy-side firm. Thus, the auction participants (e.g., buy-side firms) may bid for research/working time of the various research teams of the supplier. The auction participants may submit different bids for different research teams of the supplier. The auction participants may submit different bids for the same research team. For example, the auction participant of the securities research may seek to buy one block of time of a particular research team for a first price and a second block of time for a second price, and so on.

Also, according to other variations, the units may be preferred access level positions with the various research teams (or the corresponding primary analyst for the research team). A preferred access level (or "seat") may entitle the holder thereof to a greater level of research-related direct contact with the research team/primary analyst than consumers who do not have such a preferred access seat. For example, consumers having preferred access seats may be entitled to direct phone calls and one-to-one meetings with the primary analyst. Due to time constraints, only a number of such preferred access seats may be available for each research team/primary analyst. Consumers who do not have such preferred access seats may not be entitled to such consultative access with the primary analyst, although such consumers may still be entitled to other research work product generated by the research team, such as written reports, blast messages (e.g., blast phone messages or emails), etc. In fact, all material research views by the research team with respect to covered companies would be disseminated to all buy-side clients who are entitled to receive published research products of the analyst team.

According to various implementations, the auction may include a number of bidding stages so as to allow bidders to, for example, hone their bids in view of the results of previous bidding stages. If the number of units requested by the winning bids in the final allocation exceeds the number of available units (a condition referred to as "oversubscription"), the available units may be allocated to the winning bidders on a pro rata basis or some other allocation technique. Also, the auction may place caps and/or floors on the quantity and/or price of the bids. Also, non-competitive bids, i.e., bids with a specified quantity but no price, may be permitted.

In another general aspect, the present invention is directed to an auction system for auctioning such research resource units. The auction, as described below, may be conducted over the Internet according to various embodiments.

Other benefits and features of the present invention will be apparent from the description below.

DESCRIPTION OF THE FIGURES

Embodiments of the present invention will be described by way of example in conjunction with the following figures, wherein.

DETAILED DESCRIPTION

Various embodiments of the present invention are directed to systems and methods for auctioning access to securities research resources. For purposes of the description to follow, the supplier of the securities research is sometimes referred to as a "sell-side firm" or as the "supplier." The sell-side firm may be, for example, a brokerage or investment house. The consumer of the securities research may be an institutional investor, such as a pension fund, a mutual fund, or a hedge fund, or any other type of buy-side firm. A consumer of securities research is referred to herein as a "client" of a sell-side firm supplying the securities research or as a "buy-side firm," or "consumer." Securities research may refer to any kind of research generated by a sell-side firm regarding securities (e.g., stock or bonds).

Figure 1:
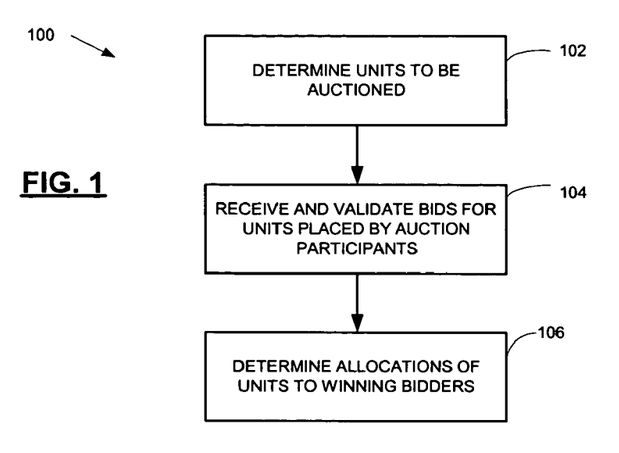
FIGS. 1 is a flowchart illustrating a process for auctioning securities research resources according to various embodiments of the present invention.

FIG. 1 is a flowchart of a method 100 for auctioning securities research resources according to various embodiments of the present invention. The method 100 may be performed, for example, by the supplier of the securities research and/or a third party conducting the auction on behalf of the supplier. At step 102, the discrete units of securities research resources to be auctioned may be determined. The research resource units are preferably limited resources. That is, for example, the units may be research/working time segments (e.g., hours) of a research team over a certain time period (e.g., one year). Such a time unit may entitle the consumer to occupy a member of the research team for an amount of time corresponding to the time unit for research-related purposes for the benefit of the consumer. Thus, the consumer may be entitled to, for example, consultative services with members of the research team during the allotted time, such as phone calls with team members, tailored emails from team members drafted in the allotted time, and other consultative communications. Accordingly, in this step the supplier would need to determine the number of working hours available from each of its research teams over the time period. This may be done, for example, by adding the projected number of hours each member of the team can devote to adequately fulfilling such consultative research-related demands of the buy-side clients over the period of time. The quantity of research time available from each of the respective research teams may vary with the capabilities of the teams.

The units may also be, for example, preferred access level positions (or "seats") for research resources from the various research teams (and/or primary analyst of each team) of the supplier. Each research team/primary analyst may have a limited number of such seats available to consumers at a given time (e.g., twenty to fifty seats). Thus, in this step the supplier may need to determine the number of such preferred access seats that each primary analyst/research team can accommodate. The quantity of seats available from each of the respective research teams/primary analysts may vary with the capabilities of the teams/primary analysts. A consumer or buy-side firm in possession of such a seat may be referred to as a "seat-holder." The seat may entitle the seat-holder to a greater level of consultative access to, for example, the primary analyst of the research team than non-seat-holders. For example, seat-holders may be entitled to direct telephone calls and/or face-to-face meetings with the primary analyst (or, for example, x number of direct research-related contacts with the primary analyst over a specified time period), whereas non-seat-holders may not be entitled to such access to the primary analyst. Also, seat-holders may be entitled to attend corporate road shows and/or corporate management meetings with the primary analyst, whereas non-seat-holders may not be entitled to attend such events. Buy-side clients of the sell-side firm that do not hold such seats, however, would still be entitled to all material research views of the primary analyst/research team with respect to covered companies that are disseminated in research products published by the primary analyst/research firm, such as published written reports (electronic or hardcopy reports), blast messages (e.g., blast phone mail or email messages), etc.

Also, according to various embodiments, different levels of preferred access services seats may even be used. That is, two (or more) types of such seats may be defined—one seat level providing more access to the research team/primary analyst than the other seat level (and so on). The different seat levels may be auctioned separately, as will be apparent from the description below. Also, alternatively or additionally, the units may be preferred access service seats with a junior member of the research team, rather than with the primary analyst. Thus, the sell-side firm may auction primary analyst seats as well as junior analyst seats.

According to other embodiments, the auctioned units may be one or more private meetings with a member of a research team of the sell-side firm. Such meetings may be face-to-face, at a location of the buy-side client and/or at a location of the sell-side research team, or the meetings may be via teleconference or videoconference. According to other embodiments, the units may entitle the holder to attend one or more conference calls, conferences or seminars conducted by a member of the research team where attendance at the event is limited to a certain number of participants. In other embodiments, the units may entitle the holder to attend one or more corporate access meetings with a member of the research team in attendance. Also, the auctioned units may be combination of these items.

The entity performing the auction (e.g., the supplier) may auction the units to potential consumers. The auction may be open only to certain potential consumers of the supplier's research, e.g., certain buy-side firms, or may be open to a broad community of consumers. The auction may include research units from each of its various research teams, or a number of different auctions may be conducted—one for each of the various research teams.

The auction may, for example, use a Dutch action-type format. In a Dutch auction-type format, the seller (i.e., the supplier of the research units) may specify a starting bid amount or range, and indicate the quantity of units available in the auction. Bidders who are interested in bidding on these items decide how many of the items they want and how much they want to pay for each item and then place their bid. When the auction ends, the bidders who place the highest bids for the items earn the right to purchase the items. The winning bidders may pay with cash or by some other means agreeable to both parties, such as soft dollar credits.

Referring to FIG. 1, at step 104, the first bidding stage of the auction may be opened and correspondingly bids for units of the securities research resources may be received from bidding consumers. Each bid may include a bid quantity and a bid price. The bid quantity may refer to the number of units that the bidder would like. The bid price is the amount that the bidder is willing to pay for the specified number of units. According to various implementations, the bids may be made public by the entity conducting the auction or the bids may be held in secret (i.e., remain sealed).

It is envisioned that a particular consumer/bidder may make more than one bid for a particular unit. That is, a bidder may place a high value on a certain base level of units from a particular research team. The bidder may then submit a relatively high-priced bid for the base level of units in order to increase the likelihood of winning at least the base level of units in the auction. The bidder may also value additional units from the research team, and so also submit a bid for the additional units, but at a lower bid price than the bid price for the base level of units, reflecting the lower perceived value of the additional units to the bidder.

There may be time limits on the various bidding stages. That is, participants in the auction may be required to submit their bids within the time limit set for each such bidding stage. Participants in the auction may place their bids with the entity conducting the auction using a variety of communication channels, as described in more detail below. Also, received bids are preferably validated before processing. That is, the bids should be examined to determine whether, for example, they were submitted by eligible bidders, the price and quantity levels are positive numbers (and/or whole numbers where appropriate), whether the price and quantity levels are within the applicable ranges (described in more detail below), and so on. Invalid bids and late bids may be rejected and, consequently, not used in determining the final allocations of units to winning bidders.

Next, at step 106, at the close of the bidding process, the available units of securities research resources may be allocated to the winning bidders. The winning bidders may be any bidder who submits a bid at or above the "clearing price" for the particular research unit. The "clearing price" corresponds to the highest price at which all the securities are sold in the auction. The winning bidders may be allocated the number of units requested by each of their respective winning bids, or some fraction thereof if the number of units requested by the winning bids exceeds the number of available units. For example, if the number of units requested by the winning bids exceeds the number of available units, the available units may be allocated to the winning bidders on a pro rata basis or according to some other allocation scheme.

In a Dutch auction, the price for the units, i.e., the price that the winning bidders pay to the supplier of units, corresponds to the clearing price from the auction. Thus, each winning bidder for a particular unit type pays the same price (the clearing price) for the units. According to other implementations of the present invention, the auction may use a variation of the Dutch auction sometimes referred to as a "Yankee" auction. In a Yankee auction, the price that a winning bidder pays corresponds to the bid price submitted by that winning bidder. As a result, in a Yankee auction winning bidders for a particular unit type may pay different prices. Also, if a particular bidder submitted two winning bids, the bidder may pay different prices for each of its winning bids in a Yankee auction. According to yet other embodiments, all winning bidders may pay a weighted average of the winning bid prices. The results of the allocation may be disclosed to all bidders or, in other variations, winning bidders will only be disclosed their respective allocation and corresponding price.

The auction process of FIG. 1 may include a single bidding stage or a number of bidding stages (e.g., two or more). According to a multi-stage auction, non-final allocation determinations may be made at the close of each non-final bidding stage and bidders may analyze the results of the first (or previous) bidding stages to hone their bids for the second (or subsequent) bidding stage. The final allocation of the units may be based solely on bids from the second (or last) auction. According to various embodiments, only bidders who placed bids in a first bidding stage may participate in subsequent bidding stages, and so on.

According to various embodiments, the auction may caps and/or floors on the number of units that may be requested in a bid. For example, where the units are preferred access seats, bidders may be prohibited from requesting more than two seats with a particular research team. Also, where the units are research time from a research team, the minimum bid may be, for example, 10 hours for a particular team and the maximum bid may be, for example, 100 hours. Also, there may be floors and caps on the bid price. The caps/floors may be adjusted for the various bidding stages at, for example, the discretion of the supplier.

Also, according to various embodiments, bidders may be permitted to submit "non-competitive" bids (i.e., an auction bid that specifies a quantity but no price). With a non-competitive bid, a bidder may be guaranteed to receive a certain allocation of a certain number of units at a price determined based on the auction results.

If the amount of a particular auction unit requested by the winning bidders exceeds the available number of units in the auction, the available units may be allocated to the winners on a pro rata basis. In a pro rata allocation scheme, each winning bidder receives an allocation based on the ratio of the quantity requested in their winning bid to the total quantity requested by the winning bids. The following simplified example illustrates how a pro rata allocation might work in practice. For example, assume that 200 units of securities research resources are being auctioned and the sum of the bid amounts of the winning bids is 220. In that case, each bidder will be allocated 90.9% of their bid amount. For example, the units may be allocated to the winning bidders as follows:

TABLE 1

| Successful Bidder | Bid Quantity | Unit Allocation |
|---|---|---|
| A | 10 | 9 |
| B | 50 | 45 |
| C | 15 | 14 |
| D | 75 | 68 |
| E | 45 | 41 |
| F | 25 | 23 |
| Total: | 220 | 200 |

According to yet another allocation scheme, particularly useful in a Yankee auction format (where winning bidders may pay a different price per unit for the same unit type), the bidders who place winning bids above the lowest winning bid price (i.e., above the clearing price) receive all of their requested units, and bidders who bid the lowest winning bid price (i.e., bid the clearing price) share the remaining units on, for example, a pro rata basis or some other allocation basis.

The supplier may repeat the auction process periodically, such as quarterly, semi-annually, annually, etc., to thereby re-allocate the research resources of the supplier to reflect changes in supply and demand. Also, the supplier may conduct multiple auctions for different types of units. For example, a supplier may conduct an auction for seats giving preferred access to certain primary analysts as well as an auction for blocks of research time associated with certain research teams. Bidders may submit bids in each auction. Also, the supplier may conduct separate auctions for each research team/covered industry team of the supplier, or the supplier may conduct an omnibus auction in which units from multiple research teams of the supplier are auctioned. In such an auction, the bids would need to identify the relevant research team/primary analyst/industry sector. Also, where there are different levels of preferred access seats, the supplier may auction the preferred access seats separately.

According to various implementations of the auction, if it is determined at the close of the bidding that not enough bids have been submitted to sell all of the available units, the supplier may choose to perform the auction process again, this time with a lower minimum bid quantity and/or lower minimum bid price. The supplier may repeat this process if necessary until all of the available units are sold.

According to various embodiments, the auctions for the research resource units may be conducted over a data network, such as the Internet or some other type of IP network.

Figure 2:
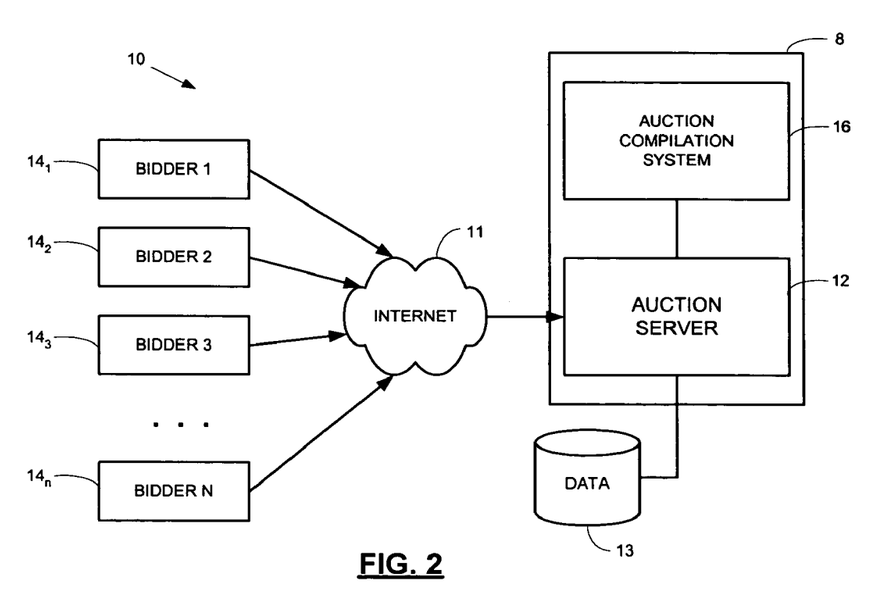
FIG. 2 is a diagram of a network for auctioning securities research resources according to various embodiments of the present invention.

FIG. 2 illustrates a system 10 for conducting the auction according to various embodiments of the present invention over the Internet 11. As shown in FIG. 2, the system 10 may include a host computing system 8, which may be implemented as one or a number of networked computing devices, such as servers, PCs, etc. The host computing system 8 may include an auction server 12 that may generate and host web pages pertaining to the auction. For example, the auction server 12 may generate and host pages that display information about the auction, based on data stored in a database 13, such as a description of the units being auctioned, the number of auction stages in the auction, the time remaining in the current auction stage, etc. The auction server 12 may also generate and host pages that allow visitors, such as prospective bidders 14, to search for particular types of units being auctioned, submit bids for auctioned items, and display the results of completed auctions. The bidders 14 may access the web pages over the Internet 11.

The host computing system 8 may also include an auction compilation module 16 in communication with the auction system 12. The auction compilation module 16 may be implemented as as software code to be executed by a processor (not shown) of the host computing system 8 using any type of computer instruction type suitable such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM or DVD-ROM.

The auction compilation module 16 may verify the bids received by the auction server 12 over the Internet 11, and determine the allocation of the auctioned units to the winning bidders based on the received bids. For example, the auction compilation module 16 may first verify the received bids by, for example, determining whether the bids are from registered bidders, ensuring that the bid quantities and prices are acceptable (e.g., not negative numbers), determining whether the bids have been submitted with the allotted time frame for the auction, etc. The auction compilation module 16 may then determine the allocation among the winning bidders based on the valid bids according to, for example, one of the allocation techniques described above.

Figure 3:
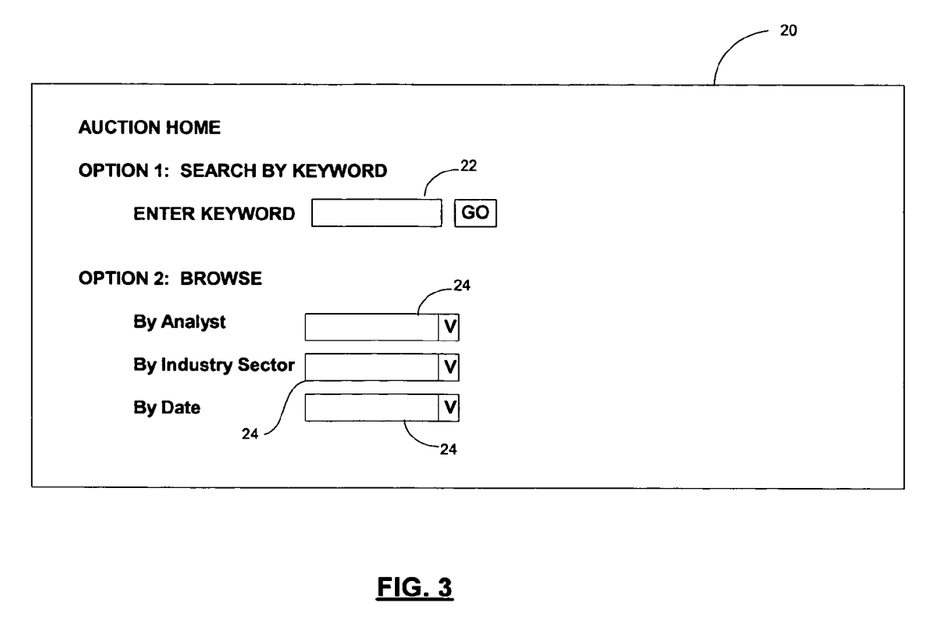

FIG. 3 is a screen shot of a web page 20 that the auction server 12 may serve to the prospective bidders 14 that allows the prospective bidders 14 to search for a particular auctioned item. The web page 20 may include a field 22 where a visitor to the web site may enter a keyword(s) to search for a particular auctioned item. For example, the visitor to the web site may enter a particular industry (e.g., automotive, semiconductor, financial services, etc.) or the name of a particular analyst to find relevant auctions. Also, the web page 20 may include drop down windows 24 where the site visitor could review and select certain auctions grouped, for example, by industry, analyst or date.

Figure 4:
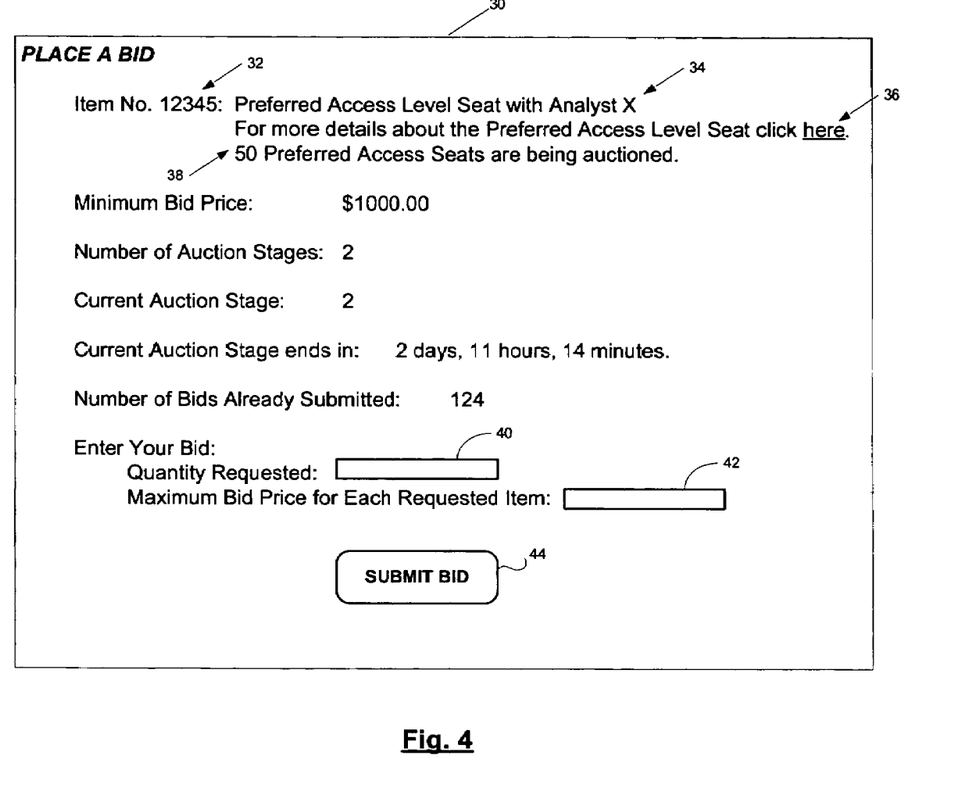

FIG. 4 is a screen shot of a web page 30 that the auction server 12 may serve to a prospective bidder 14 who selected a particular auction. As shown in FIG. 4, the web page 30 may include an identification number 32 for the auctioned item, a listing 34 of the auctioned item, a link 36 to additional information about the auctioned item, and an indication 38 of the number of units available in the auction. Also as shown in FIG. 4, the web page 30 may indicate the minimum bid price (in this case $1,000), identify the number of auction stages (in this case 2), the current auction stage (in this case the 2nd stage), the amount of time remaining in the current auction stage, and the number of bids already submitted. Other information about the auction may also be displayed. In addition, the web page 30 may include a field 40 where the auction participant may enter the number of units requested and a field 42 for entering the bid price for each of the requested units. The auction participant may submit the bid by clicking on the SUBMIT icon 44.

Figure 5:
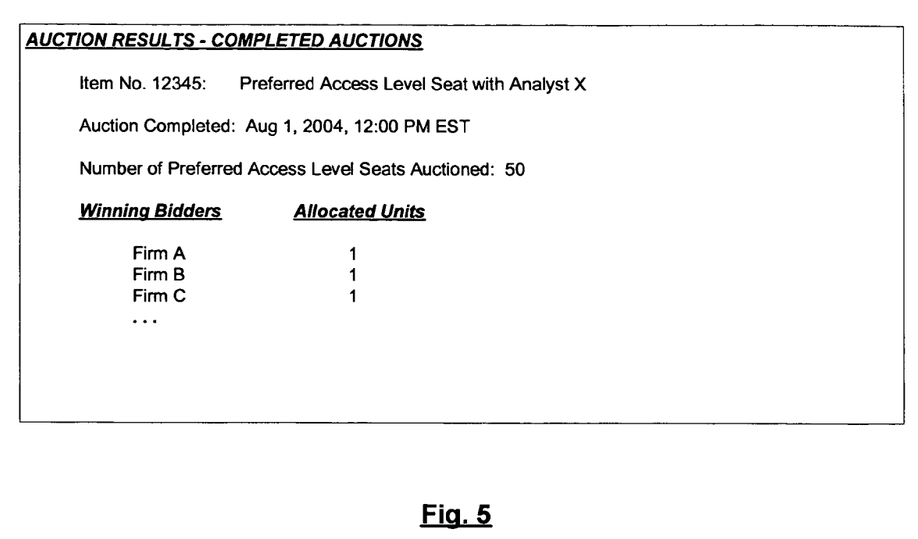

FIG. 5 is a screen shot of a web page 50 the auction server may host that posts the results from an auction. The web page 50 may list the auction participants who were allocated at least one of the auction units. According to various embodiments, the web page 50 posting the results of the auction may list the bid price of each winning bid, or that information may be maintained in confidence by the entity conducting the auction.

While several embodiments of the invention have been described, it should be apparent, however, that various modifications, alterations and adaptations to those embodiments may occur to persons skilled in the art with the attainment of some or all of the advantages of the present invention. For example, the steps of the auction process described above may be performed in various orders. It is therefore intended to cover all such modifications, alterations and adaptations without departing from the scope and spirit of the present invention as defined by the appended claims.

What is claimed is:

1. A computer-implemented method for auctioning units of limited securities research resources from a supplier of securities research to consumers of the supplier's securities research, the method comprising:

generating auction search data by an auction server of a computer system, wherein the auction server comprises at least one processor and an operatively associated computer readable medium, wherein the auction server is in electronic communication with a database comprising data describing the units of securities research, wherein the generated auction search data comprises data that enables bidders to search for units to be auctioned;

generating, by the auction server, auction description data that comprises a listing of the units being auctioned, an indication of a minimum bid price for each unit, and an indication of a current auction stage;

generating, by the auction server, bid submission data, wherein the bid submission data enables the bidders to submit bids;

receiving, by the auction server, a plurality of bid data, during one of a plurality of auction stages, wherein each bid data is received from one of the bidders and identifies a quantity of the units and a price for the identified units;

verifying the bid data by the auction server;

determining, by the auction server, an allocation of the units among the bidders that have submitted bid data based on the verified bid data;

generating, by the auction server, auction result data, wherein the auction result data indicates the results of completed auctions; and wherein the units of the securities research resources comprise a plurality of first preferred access level positions associated with a first research team, and a plurality of second preferred access level positions associated with the first research team, wherein the first preferred access level positions entitle holders thereof to a superior level of research-related direct contact between the consumer of securities research and the first research team as compared to the second preferred access level positions; and wherein the first and second preferred access level positions entitle their holders to at least one research-related direct contact with the first research team selected from the group consisting of:
- a meeting between a representative of the position holder and at least one member of the first research team;
- attendance by a representative of the position holder at a conference call with at least one member of the first research team;
- attendance by a representative of the position holder at a conference conducted by at least one member of the first research team;
- attendance by a representative of the position holder at a seminar conducted by at least one member of the first research team; and
- attendance by a representative of the position holder at a corporate access meeting with at least one member of the first research team.

2. The method of claim 1, further comprising posting the auction search data prior to receiving the bid data.

3. The method of claim 1, wherein determining the allocation of the units includes, when the quantity of units requested by winning bidders exceeds the number of units offered in the auction, allocating the units to the winning bidders on a pro rata basis.

4. The method of claim 3, further comprising posting the results data after the allocation of the units.

5. The method of claim 1, wherein the first research team is associated with a particular industry sector.

6. A computer-implemented system for auctioning units of limited securities research resources from a supplier of securities research to consumers of the supplier's securities research, the system comprising an auction server comprising at least one processor and an operatively associated computer readable medium, wherein the auction server is in electronic communication with a database describing the units of securities research, and wherein the computer readable medium comprises instructions thereon that, when executed by the auction server, cause the auction server to:
- generate auction search data, wherein the generated auction search data comprises data that enables bidders to search for units to be auctioned;
- generate auction description data that comprises a listing of the units being auctioned, an indication of a minimum bid price for each unit, and an indication of a current auction stage;
- generate bid submission data, wherein the bid submission data enables the bidders to submit bids;
- receive a plurality of bid data, during one of a plurality of auction stages, wherein each bid data is received from one of the bidders and identifies a quantity of the units and a price for the identified units;
- verify the bid data;
- determine an allocation of the units among the bidders that have submitted bid data based on the verified bid data;
- generate auction result data, wherein the auction result data indicates the results of completed auctions; and
- wherein the units of the securities research resources comprise a plurality of first preferred access level positions associated with a first research team, and a plurality of second preferred access level positions associated with the first research team, wherein the first preferred access level positions entitle holders thereof to a superior level of research-related direct contact between the consumer of securities research and the first research team as compared to the second preferred access level positions; and
- wherein the first and second preferred access level positions entitle their holders to at least one research-related direct contact with the first research team selected from the group consisting of:
  - a meeting between a representative of the position holder and at least one member of the first research team;
  - attendance by a representative of the position holder at a conference call with at least one member of the first research team;
  - attendance by a representative of the position holder at a conference conducted by at least one member of the first research team;
  - attendance by a representative of the position holder at a seminar conducted by at least one member of the first research team; and
  - attendance by a representative of the position holder at a corporate access meeting with at least one member of the first research team.

7. The system of claim 6, wherein the research team is associated with a particular industry sector.

8. The method of claim 1, wherein the first preferred access level positions entitle holders thereof to research-related direct contact with a primary analyst of the first research team the second preferred access level positions entitle holders thereof to research-related direct contact with a second analyst of the first research team.

9. The method of claim 1, wherein the plurality of bid data is received at a compilation module of the auction server.

10. The system of claim 6, wherein the first preferred access level positions entitle holders thereof to research-related direct contact with a primary analyst of the first research team the second preferred access level positions entitle holders thereof to research-related direct contact with a second analyst of the first research team.

11. The system of claim 6, wherein the plurality of bid data is received at a compilation module of the auction server.

* * * * *